(12) United States Patent
Niedermann

(10) Patent No.: US 12,029,306 B2
(45) Date of Patent: Jul. 9, 2024

(54) CONTAINER FOR COSMETICS AND OTHER PRODUCTS WITH A LIMITED PERIOD OF USE, OR FOR THE TIME-CONTROLLED PRESENTATION OF PRODUCTS, WITH INTEGRATED CLOCK, ELECTRONICS SYSTEM AND TIMER FUNCTION

(71) Applicant: Yves Swiss AG, Sursee (CH)

(72) Inventor: Claude Niedermann, Oberkirch (CH)

(73) Assignee: Yves Swiss AG, Sursee (CH)

( * ) Notice: Subject to any disclaimer, the term of this patent is extended or adjusted under 35 U.S.C. 154(b) by 783 days.

(21) Appl. No.: 17/284,736

(22) PCT Filed: Sep. 15, 2019

(86) PCT No.: PCT/EP2019/074599
§ 371 (c)(1),
(2) Date: Apr. 12, 2021

(87) PCT Pub. No.: WO2020/053440
PCT Pub. Date: Mar. 19, 2020

(65) Prior Publication Data
US 2021/0321747 A1    Oct. 21, 2021

(30) Foreign Application Priority Data

Sep. 16, 2018 (CH) .................................. 1099/18
Jun. 10, 2019 (CH) .................................. 782/19

(51) Int. Cl.
*A45D 40/18* (2006.01)
*A45D 40/00* (2006.01)
(Continued)

(52) U.S. Cl.
CPC ......... *A45D 40/18* (2013.01); *A45D 40/0068* (2013.01); *B65D 23/12* (2013.01);
(Continued)

(58) Field of Classification Search
CPC ...... G04B 47/00; G04B 47/008; G04B 37/12; G04F 1/00; G04F 1/005
See application file for complete search history.

(56) References Cited

U.S. PATENT DOCUMENTS 4,419,016 A   12/1983   Zoltan
5,746,348 A    5/1998   Bloom
(Continued)

OTHER PUBLICATIONS

Written Opinion and International Search Report of PCT/EP2019/074599; mailed Jan. 15, 2020.
(Continued)

*Primary Examiner* — Edwin A. Leon
*Assistant Examiner* — Jason M Collins
(74) *Attorney, Agent, or Firm* — Polsinelli PC

(57) ABSTRACT

The container includes a clock with an accumulator or battery, with a stopwatch and alarm clock function for displaying the lifespan, for example of a cosmetic product, or also other information such as applications, ingredients, orders, product information. The container can include a receiving cylinder for introducing an exchangeable refill-capsule containing the cosmetic product In the case of an electronic clock, an electronic display provides at least the following functions: setting the current date and the current lime; setting an expiration date; clock function: displaying the calendar year, the month, the day and the time; stopwatch and alarm clock function, so that product shelf lives of cosmetics and other products with a limited period of use can be monitored, wherein an acoustic alarm signal sounds when the shelf life limit is reached, and the exposure times can also be monitored in this way.

12 Claims, 16 Drawing Sheets

Figure 1:
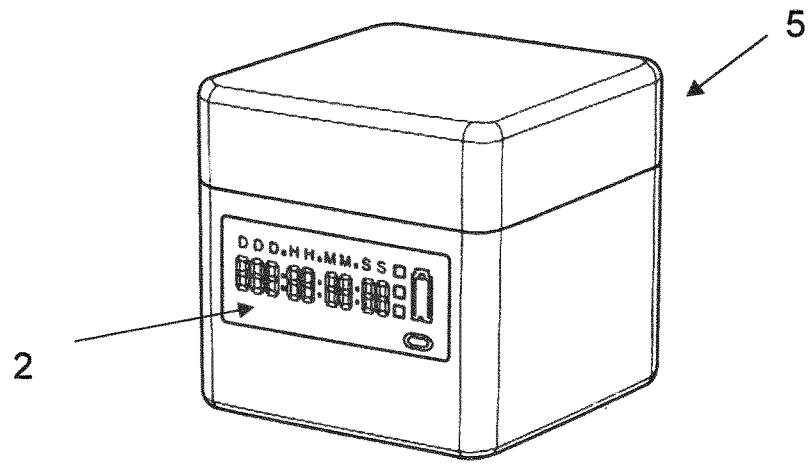

(51) Int. Cl.
*B65D 23/12* (2006.01)
*B65D 25/20* (2006.01)
*G04B 47/00* (2006.01)
*G06F 3/14* (2006.01)
*G06F 3/16* (2006.01)

(52) U.S. Cl.
CPC ........... *B65D 25/20* (2013.01); *G04B 47/008* (2013.01); *G06F 3/14* (2013.01); *G06F 3/16* (2013.01)

(56) References Cited

U.S. PATENT DOCUMENTS

| | | | | |
|---|---|---|---|---|
| 5,802,014 | A * | 9/1998 | Danko | A61J 7/0481 368/282 |
| 2008/0117719 | A1* | 5/2008 | Hildebrandt | A61J 7/0472 368/10 |
| 2009/0222130 | A1* | 9/2009 | Morse | G04F 10/00 235/375 |
| 2009/0259336 | A1 | 10/2009 | Ratnakar | |
| 2011/0121023 | A1* | 5/2011 | Milan | G04F 1/02 222/638 |
| 2016/0157598 | A1* | 6/2016 | Anelevitz | A46B 15/0048 368/1 |
| 2017/0239146 | A1* | 8/2017 | Bomhoff | A61J 7/0076 |
| 2018/0018482 | A1 | 1/2018 | Jammet | |

OTHER PUBLICATIONS

Translation of Written Opinion and International Search Report of PCT/EP2019/074599; mailed Jan. 15, 2020.

* cited by examiner

Fig. 10
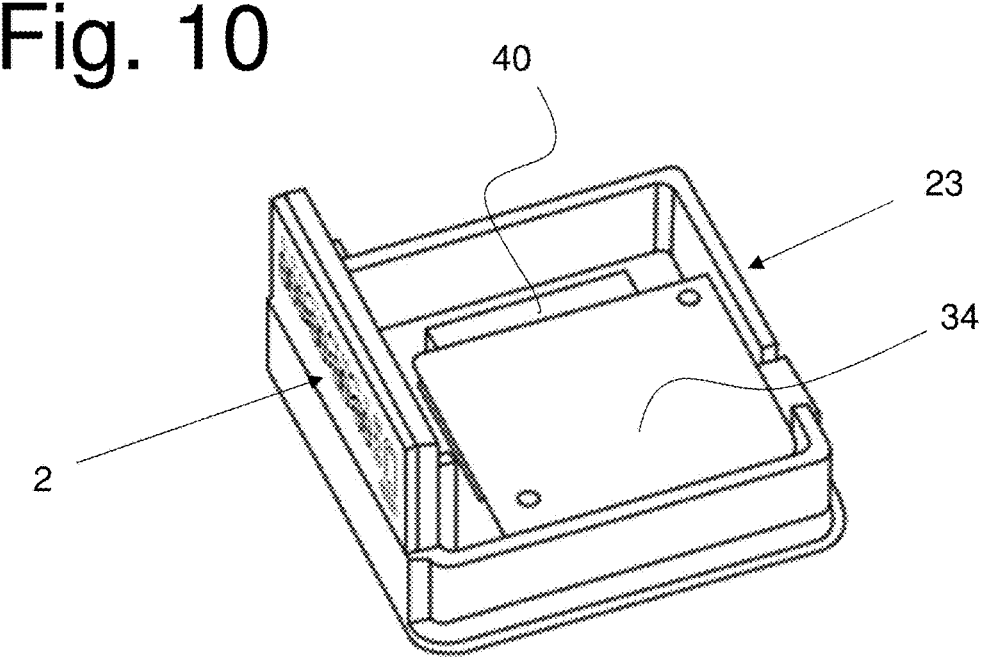
Fig. 11a
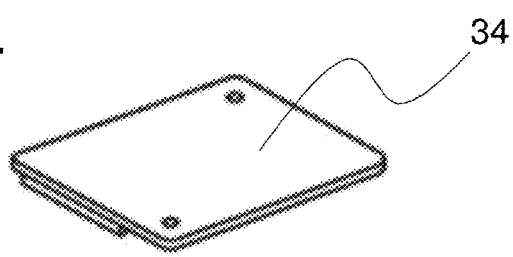
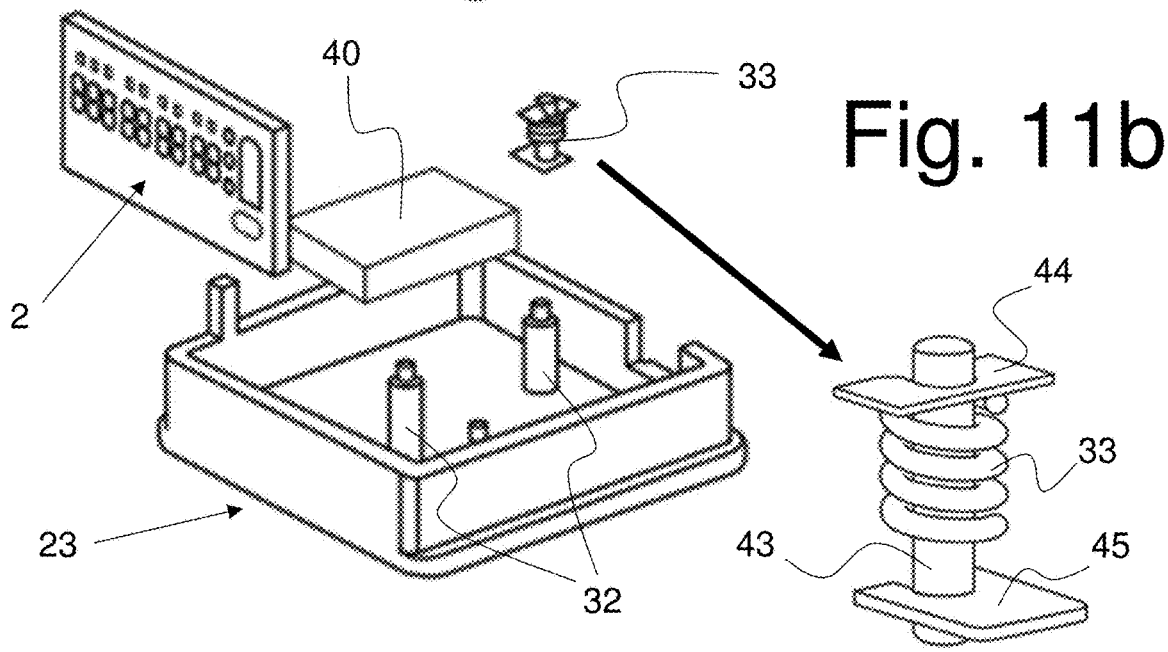
Fig. 11b

Fig. 12
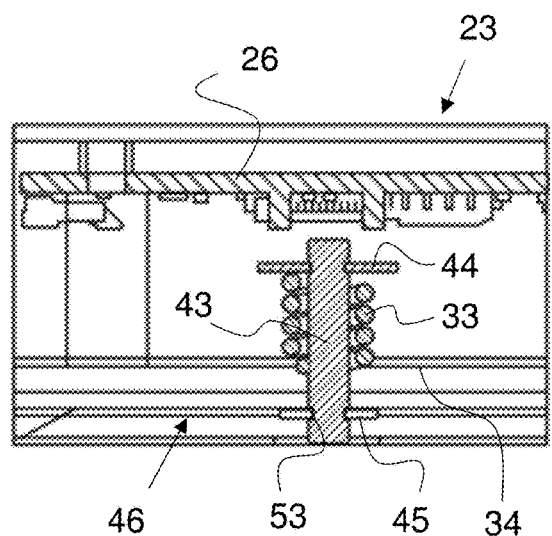
Fig. 13
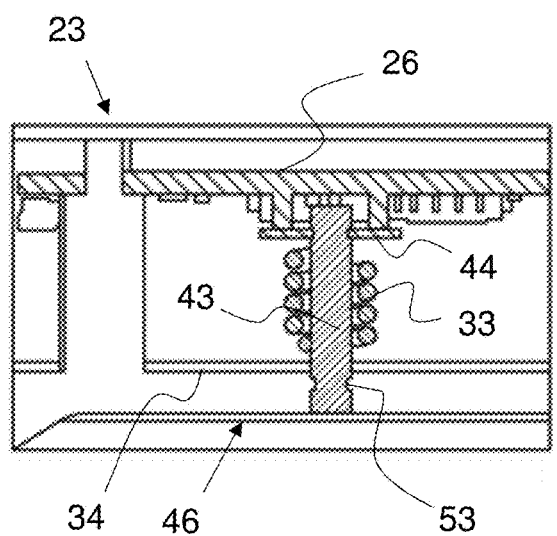
Fig. 14a
Fig. 14b
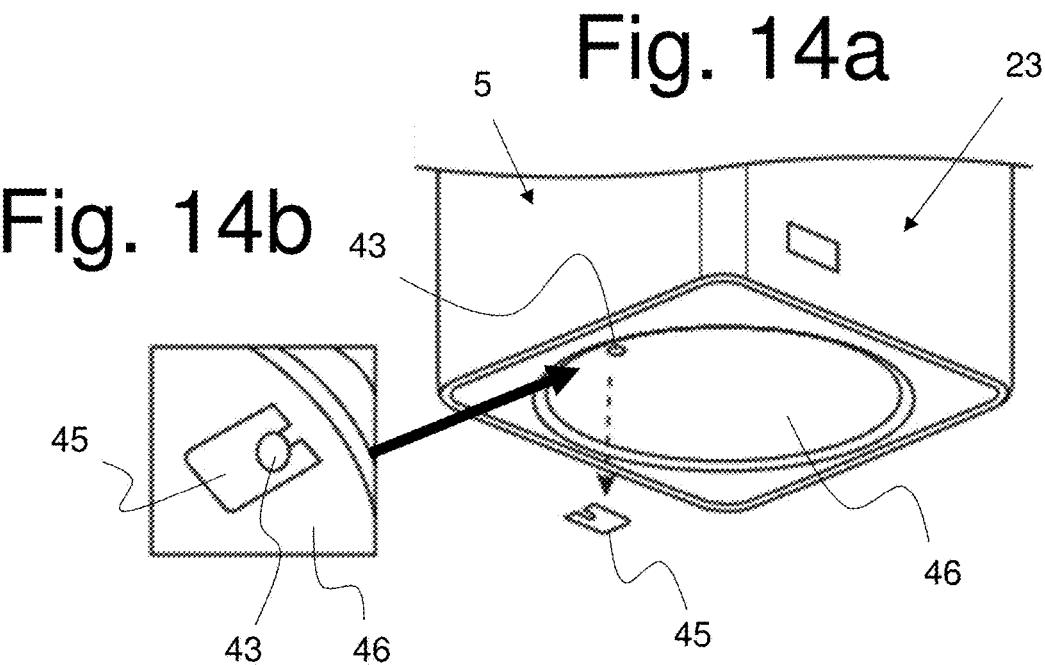

Fig. 18
Fig. 19
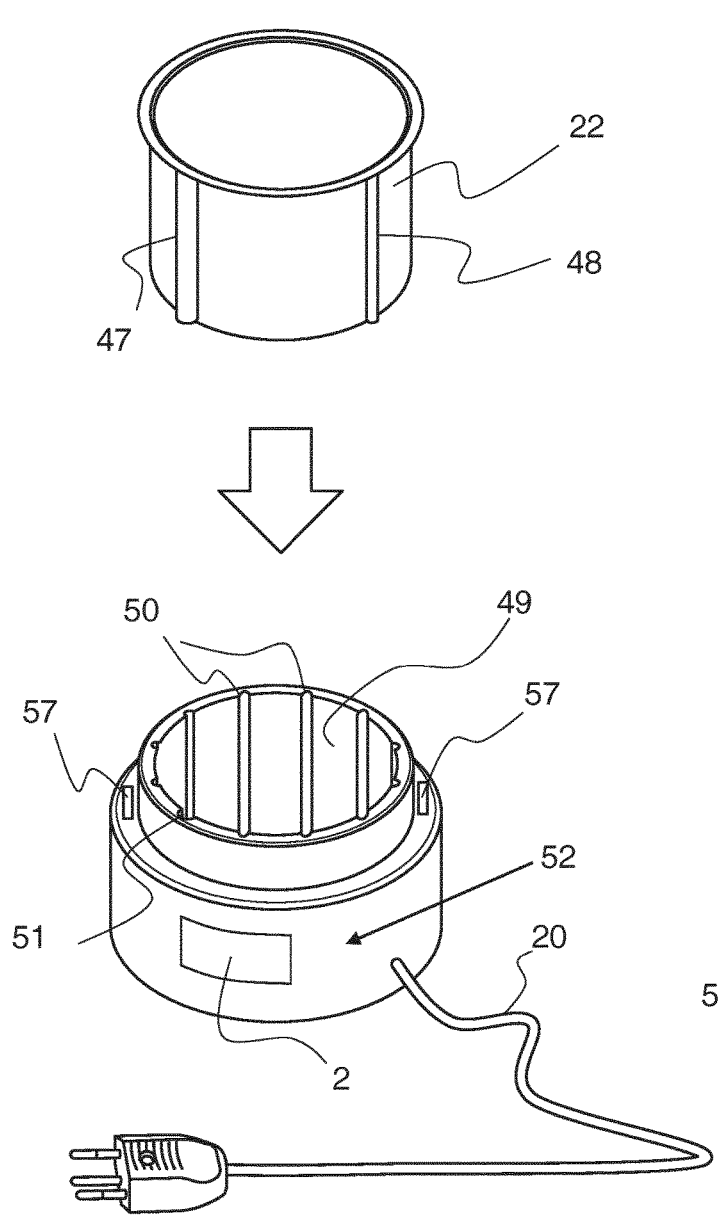
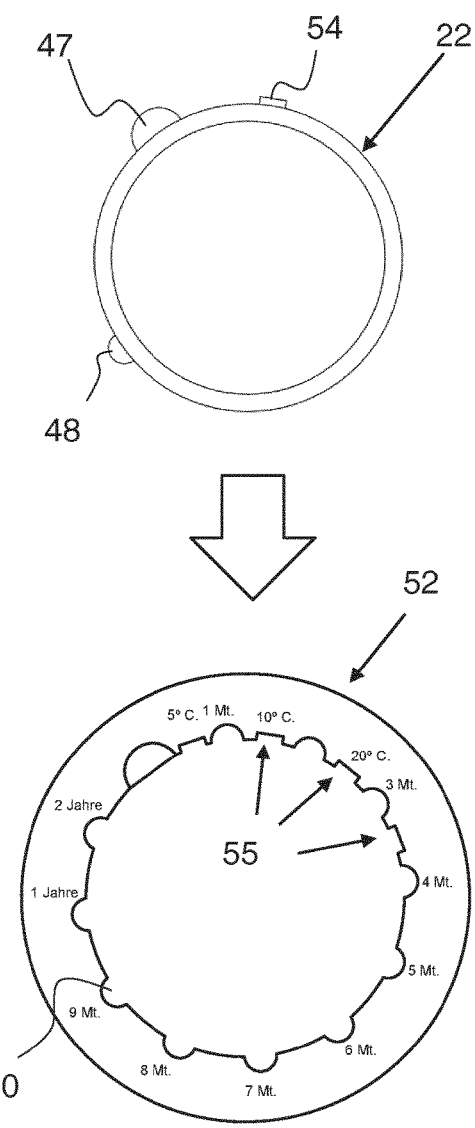

CONTAINER FOR COSMETICS AND OTHER PRODUCTS WITH A LIMITED PERIOD OF USE, OR FOR THE TIME-CONTROLLED PRESENTATION OF PRODUCTS, WITH INTEGRATED CLOCK, ELECTRONICS SYSTEM AND TIMER FUNCTION

CROSS-REFERENCE TO RELATED APPLICATIONS

This application is a national stage application of International Application Number PCT/EP2019/074599, which was filed on Sep. 15, 2019, which claims priority to Switzerland Application Number 1099/18 filed on Sep. 16, 2018 and 782/19 filed Jun. 10, 2019, each of which is incorporated by reference in its entirety.

Containers for cosmetics, for example in the form of cosmetic jars, contain skin creams, protective and make-up creams, gels, serums or powders, ie beauty products that are subject to aging and therefore usually have a recommended expiry date which in addition these products should no longer be used for health reasons. For some products, the expiry period begins when the container is opened for the first time; for others, the manufacturer prints a fixed expiry date on the packaging. Usually, the beauty product user opens the packaging without noting the date of the first opening. However, all beauty products have a limited usage time, which starts from the first opening, unless a definite expiry date is stated on the product.

If a certain product is applied to the face, for example, or is to be applied twice in succession, this product requires a certain exposure time. You then have to wait until this has passed before applying another product, be it make-up, ink or powder.

Cosmetic products are traditionally packaged in a complex manner, i.e. in expensive cans made of glass, aluminum or plastic, and these cans can usually be closed with a screw cap, snap-on lid or tilting lid. The mass of the can is often in disproportionate proportion to the content. For a few grams of an ointment, a can with a multiple of this weight or the ointment volume is distributed. And when the content of the can is used up, it ends up in the household rubbish. This fact is ecologically and economically objectionable. In addition, with a conventionally used can, you do not know how old the content is and whether it can still be used without hesitation. There are other goods or products that have a limited period of use, such as medicines such as tablets and ampoules or a serum, and also edibles of all kinds. After all, there are products that should be presented as gifts at a specific, selectable time, such as jewelry, jewels and other gems of all kinds.

The object of this invention is to provide a container for cosmetics and other products with a limited time of use or for the time-controlled presentation of products, which can directly, safely and conveniently control the shelf life or usage time as also allows the control of the exposure time or duration of action, depending on the case. In a special version of the container, a system is to be implemented to enable the distribution of such products in refill capsules and still create hygienic and easily practicable handling of the products for the people using them, not least with the aim of reduce waste associated with such products. Furthermore, this container should be suitable in a further embodiment for being able to present products such as jewelry, jewels and other gems of all kinds in a time-controlled manner in order to trigger an unexpected surprise when they are given.

In the prior art, US 2018/018482 A1 (JAMMET JEAN-CLAUDE) Jan. 18, 2018 discloses a container for cosmetics (see par. 54) and other products with limited time of use (see par. 54) or for timed presentation of products, in which a mechanical wind-up clock or an electronic clock (see par. 148) with rechargeable battery or battery (see par. 129) and associated display is incorporated (see par. 210-211), in both cases with stopwatch and alarm function to indicate the life of the contained product (see par. 153, 155, 211) or for timed presentation of the inserted product. U.S. Pat. No. 4,419,016 A (ZOLTAN BART J) Dec. 6, 1983 shows a similar container 2 with clock 8 and display 10, 12, 14 as described in column 4, lines 34-50 and column 5, lines n1-26. Also, U.S. Pat. No. 5,746,348 A (BLOOM ROBERT) May 5, 1998 shows such a container 10 with clock 60 and display 20, according to the figures and column 1, lines 37 to column 5, line 18, and also US 2009/259336 A1 (RATNAKAR NITESH) Oct. 15, 2009, with container 10 with display 25, in paragraph 36. Furthermore, it is known from US 2018/018482 that such a container may include an electronic circuit with time element as an electronic clock on an electronic PCBA board, with an associated display for visual indication of at least the remaining life time of the product contained inside the container, and optionally for visual display of text and images or movies, or additionally with a loudspeaker for triggering and playing an acoustic and/or visual product presentation on the display from a storage medium. This is disclosed in FIG. 3 and section 211. In sections 164 to 166 of FIG. 3 it is further shown and described that the container can have a receiving cylinder for inserting a capsule, which can be closed with a sealing foil, with the product as content, and that this receiving cylinder has grooves of different sizes or different profiles in its inner wall, so that the exchangeable capsule to be inserted can be inserted into the receiving cylinder with its ribs or grooves on its outer wall in only one single rotational position, depending on the rotational position.

Against this background, it is the task of the present disclosure to create such a container for cosmetics and other products with a limited time of use or for the time-controlled presentation of products, with a timer in the form of an electronic circuit which can be triggered particularly easily. Furthermore, it is a task that the electronic circuit offers various timer functions, can be operated independently of the mains and offers a first opening guarantee, indicates the product age and indicates when the maximum product age has been exceeded. The container with these functions should also be combinable into different products and should allow directly, safely and comfortably the control of the shelf life or usage time as well as, depending on the case, the control of the exposure time or duration of action. In a special embodiment of the container, a system shall be realizable to enable the distribution of such products in refill capsules and still create a hygienic and easily practicable handling of the products for the persons using them, not least with the aim of reducing the waste generated in connection with such products. Furthermore, in another embodiment, this container should be suitable for presenting products such as jewelry, jewels and other gems of all kinds in a time-controlled manner, in order to trigger an unexpected surprise effect when giving them as gifts.

This problem is solved by containers for cosmetics and other products with limited time of use or for the timed presentation of products, in which a mechanical wind-up clock or an electronic clock with rechargeable battery or battery and associated display is incorporated, in both cases with stopwatch and alarm function for indicating the life of the contained product or for the timed presentation of the inserted product, including an electronic circuit with time element as an electronic clock on an electronic PCBA board, with an associated display for visual indication of at least the remaining life time of the product contained inside the container, and optionally for visual display of text and pictures or films, or additionally with a loudspeaker for triggering and playing an acoustic and/or visual product presentation on the display from a storage medium, and characterized in that the base part contains an attachment plate which rests on insert pins, and to which a compression-spring-loaded pin projecting at the bottom from the base of the base part is directed, which pin strikes the circuit board by releasing the compression spring and closes electrical contacts there, for triggering the timer function of the electronic circuit. Particularly advantageous embodiments are achieved with the features of the dependent patent claims.

In the figures, possible embodiments of this container for cosmetics or other products with a limited period of use and also for the timely presentation of products are shown, and the function of these containers is described below.

Figure 2:
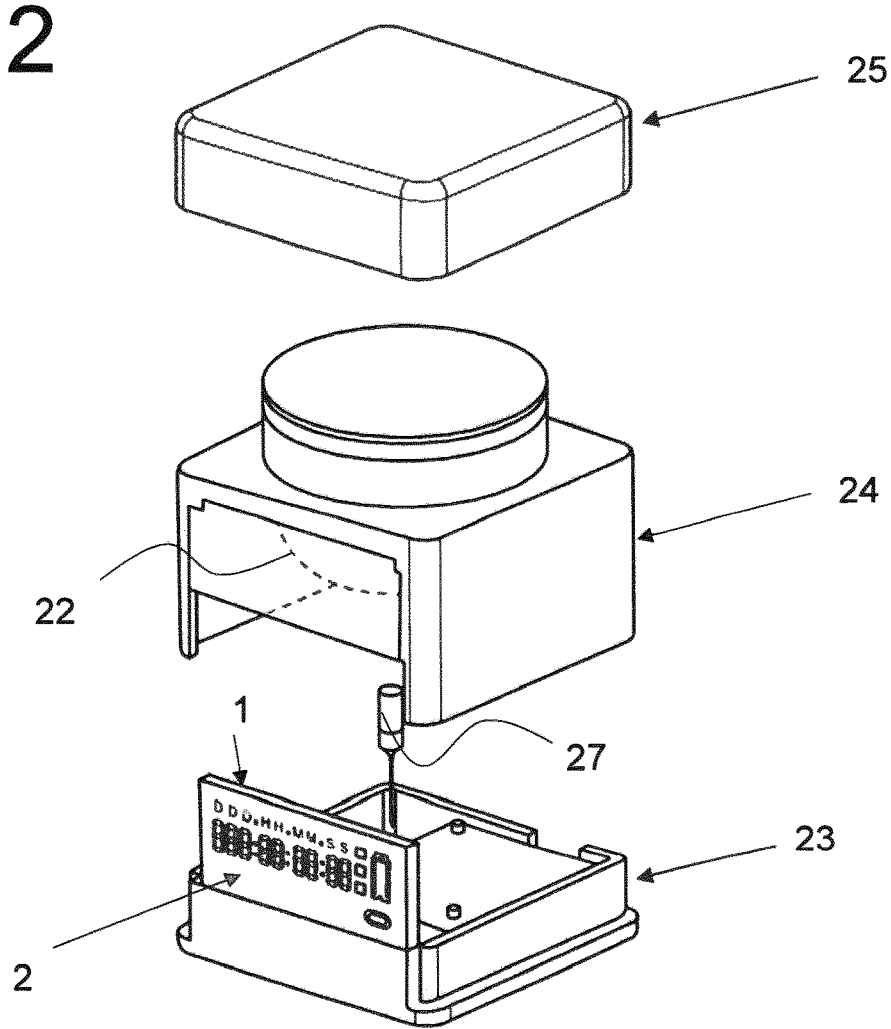
Figure 3:
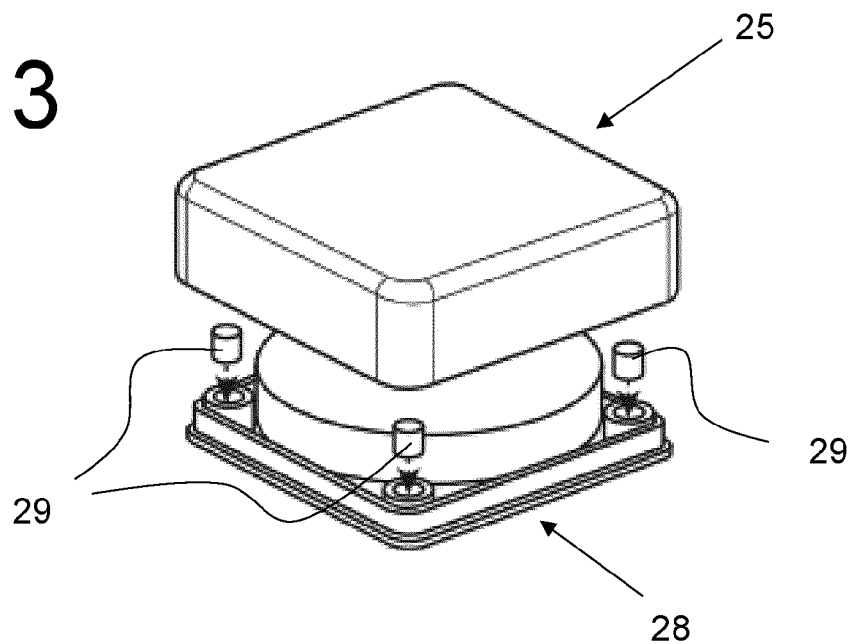
Figure 4:
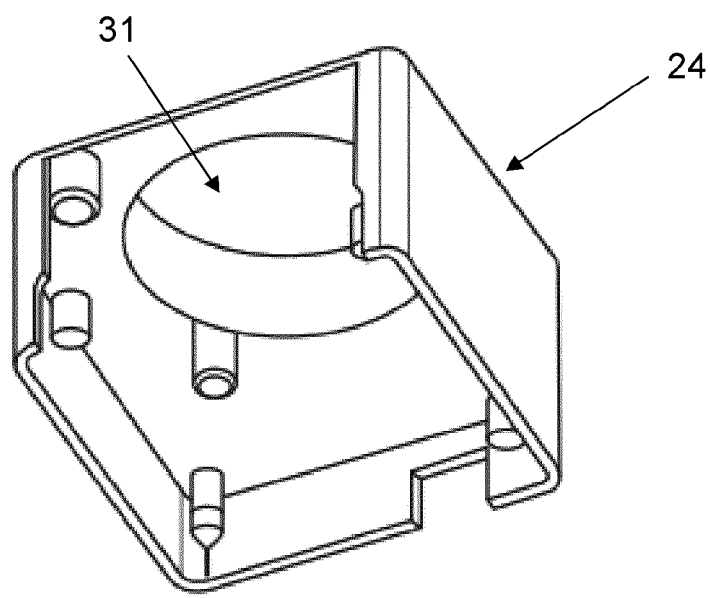
Figure 5:
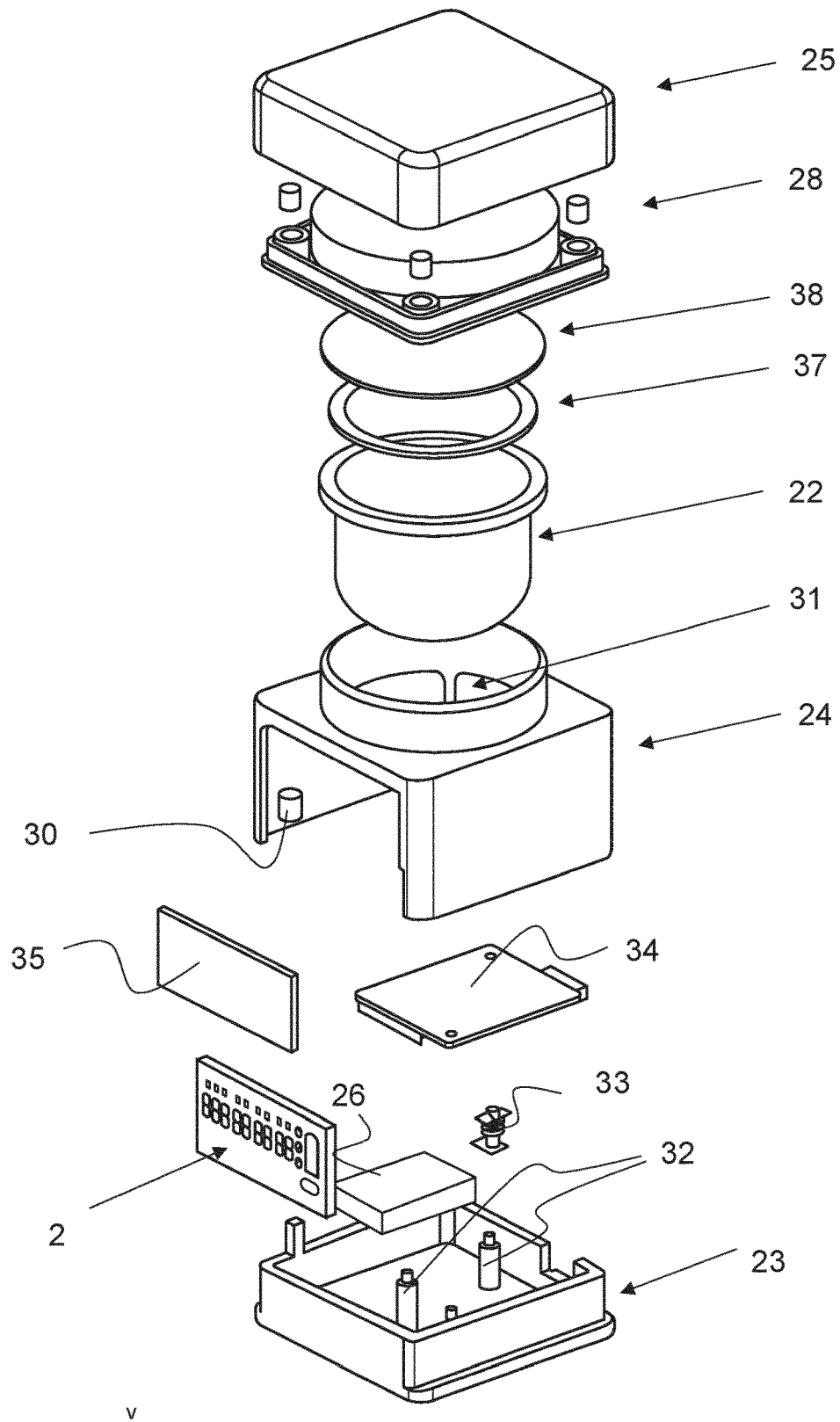
Figure 6:
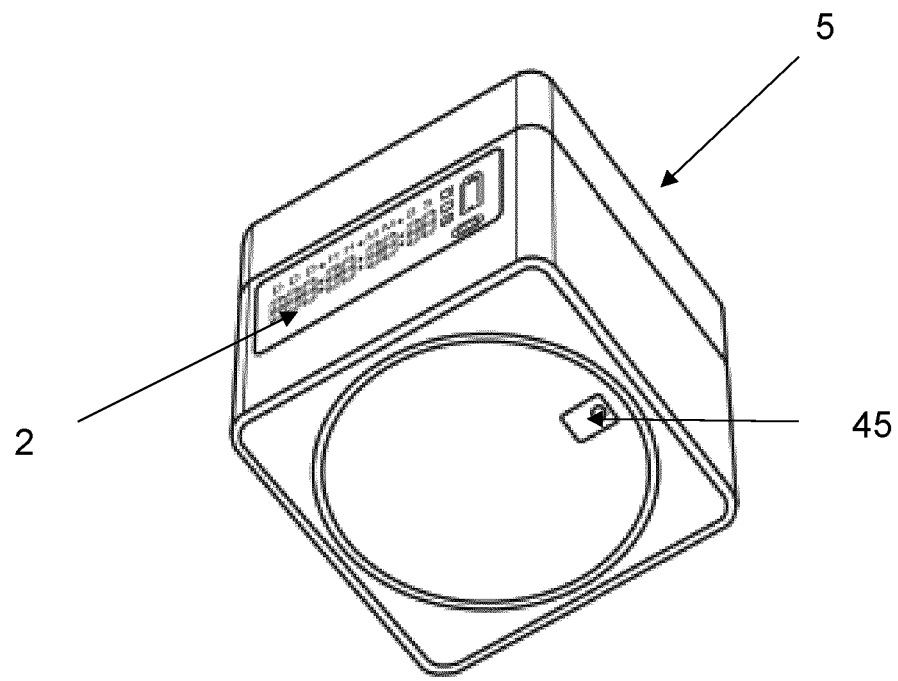
Figure 7:
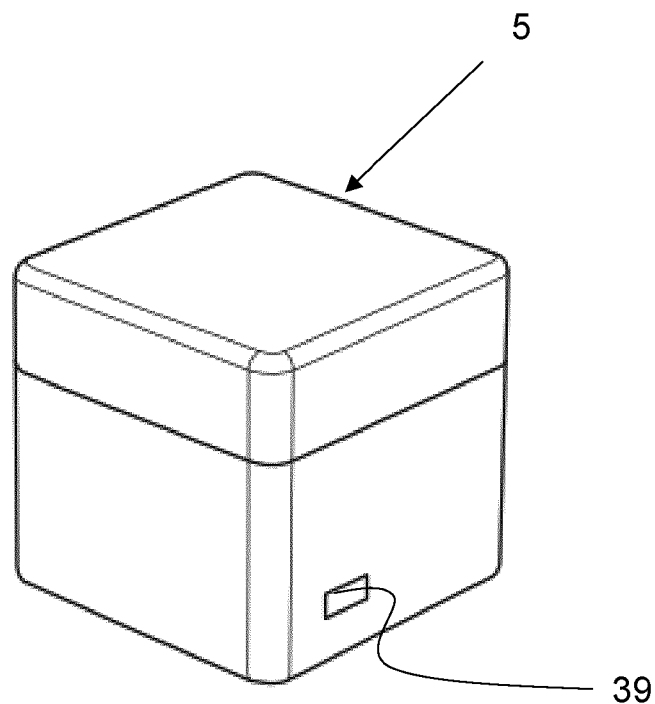
Figure 8:
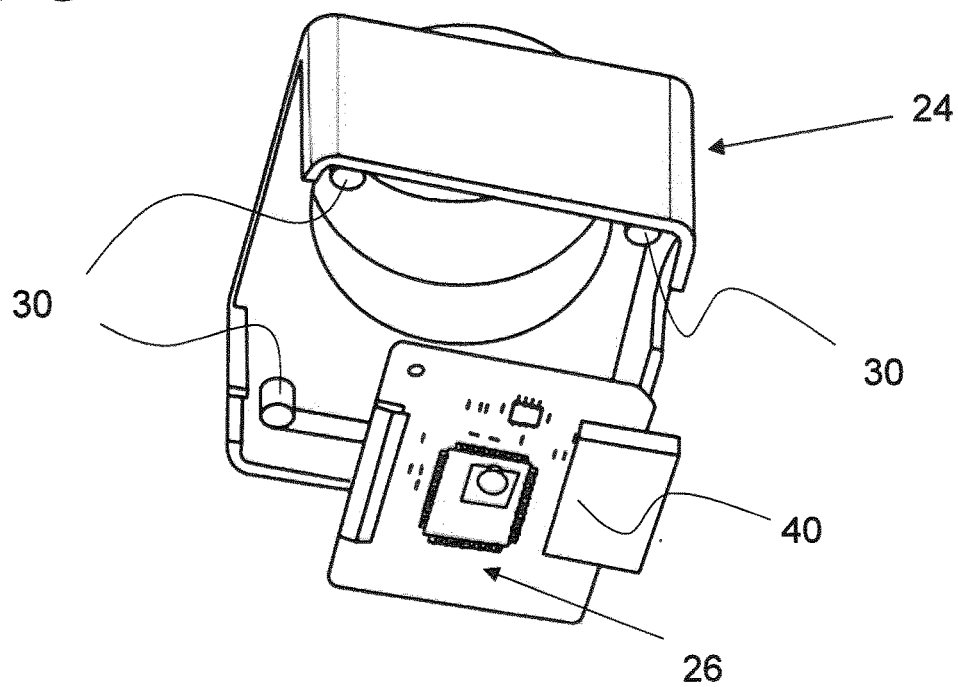
Figure 9:
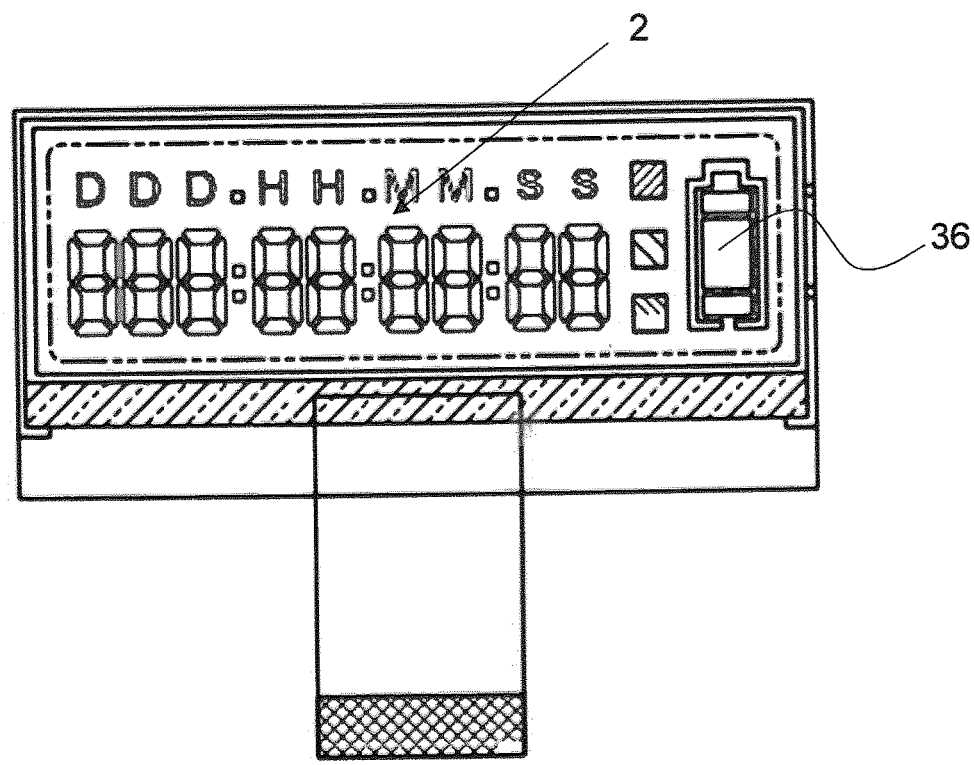
Figure 15:
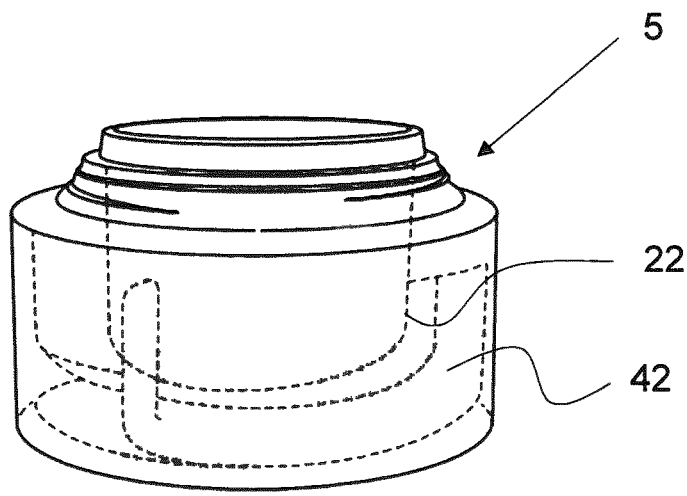
Figure 16:
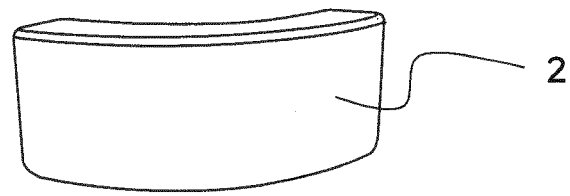
Figure 17:
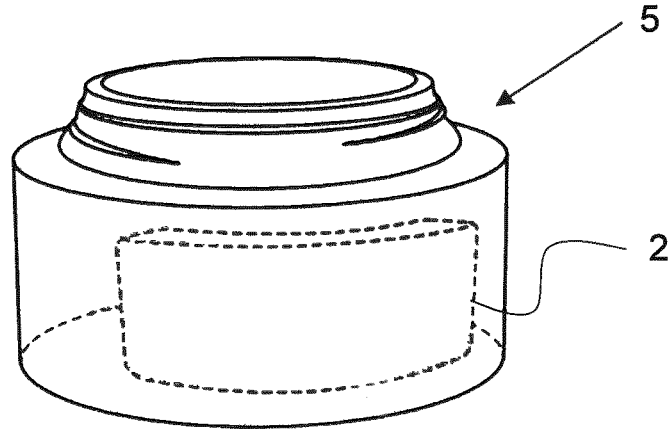
Figure 20:
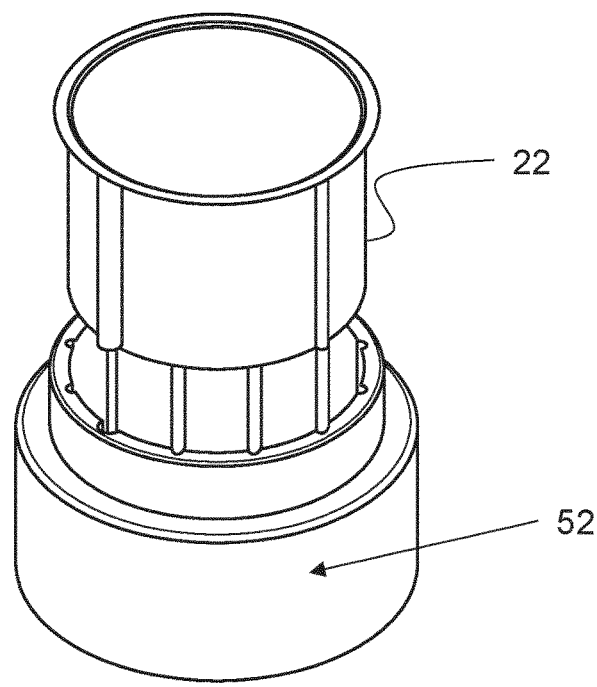
Figure 21:
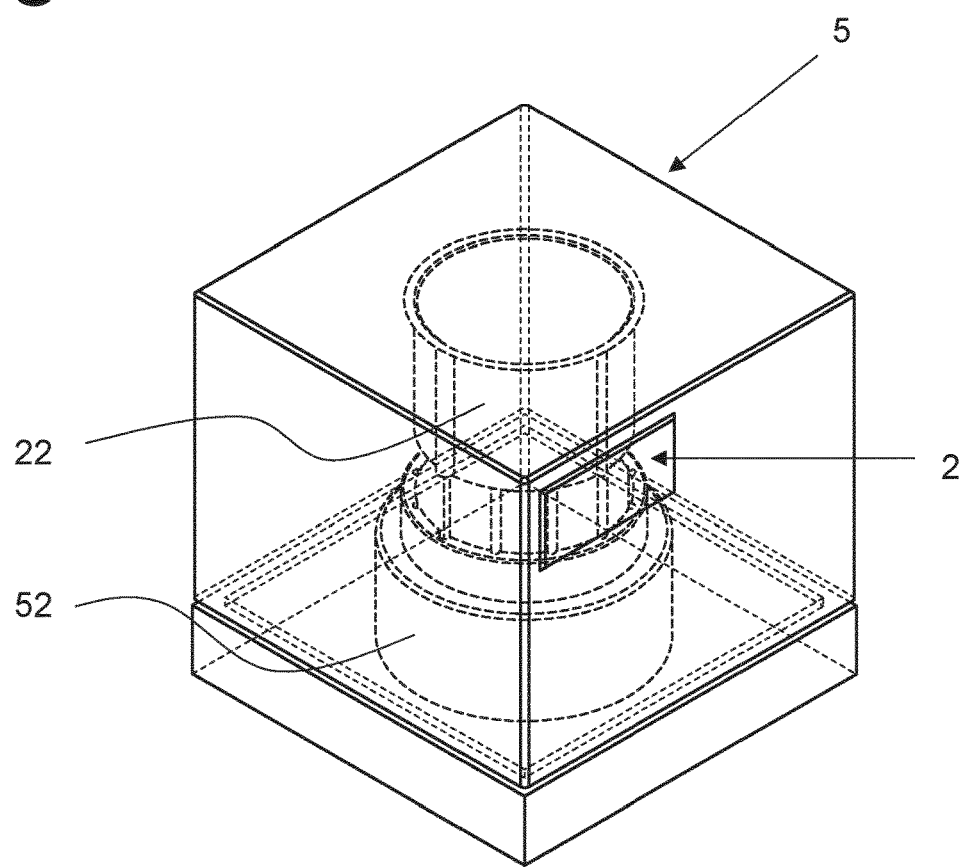
Figure 22:
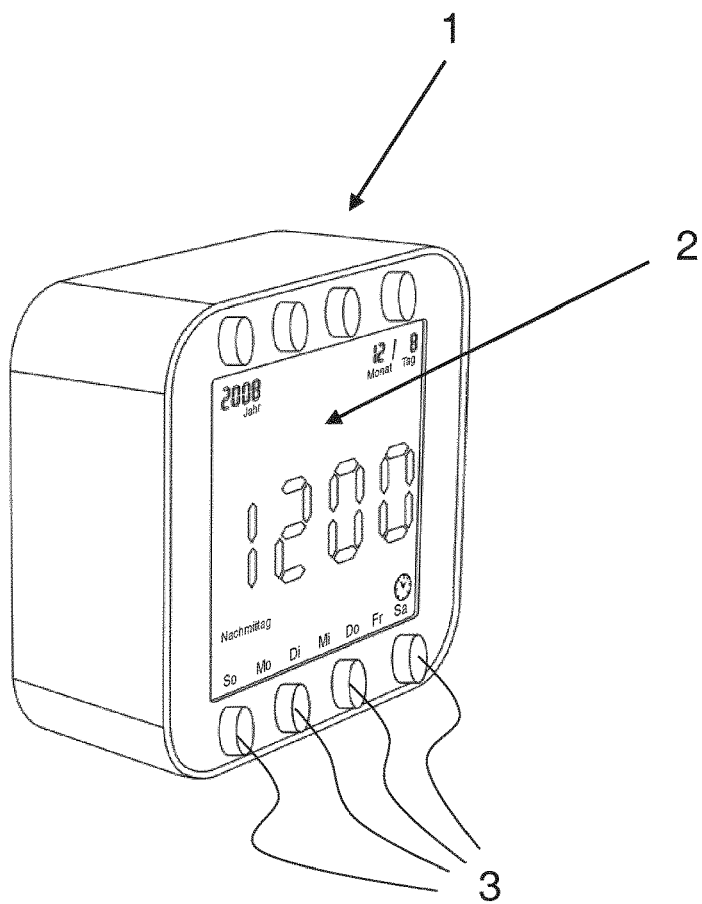
Figure 23:
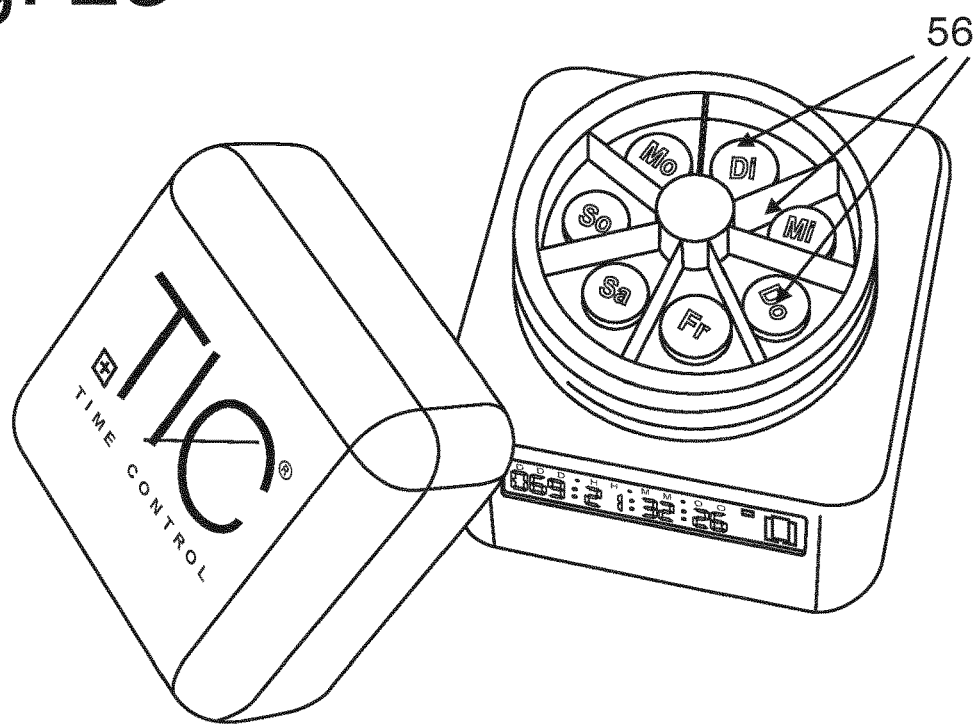
Figure 24:
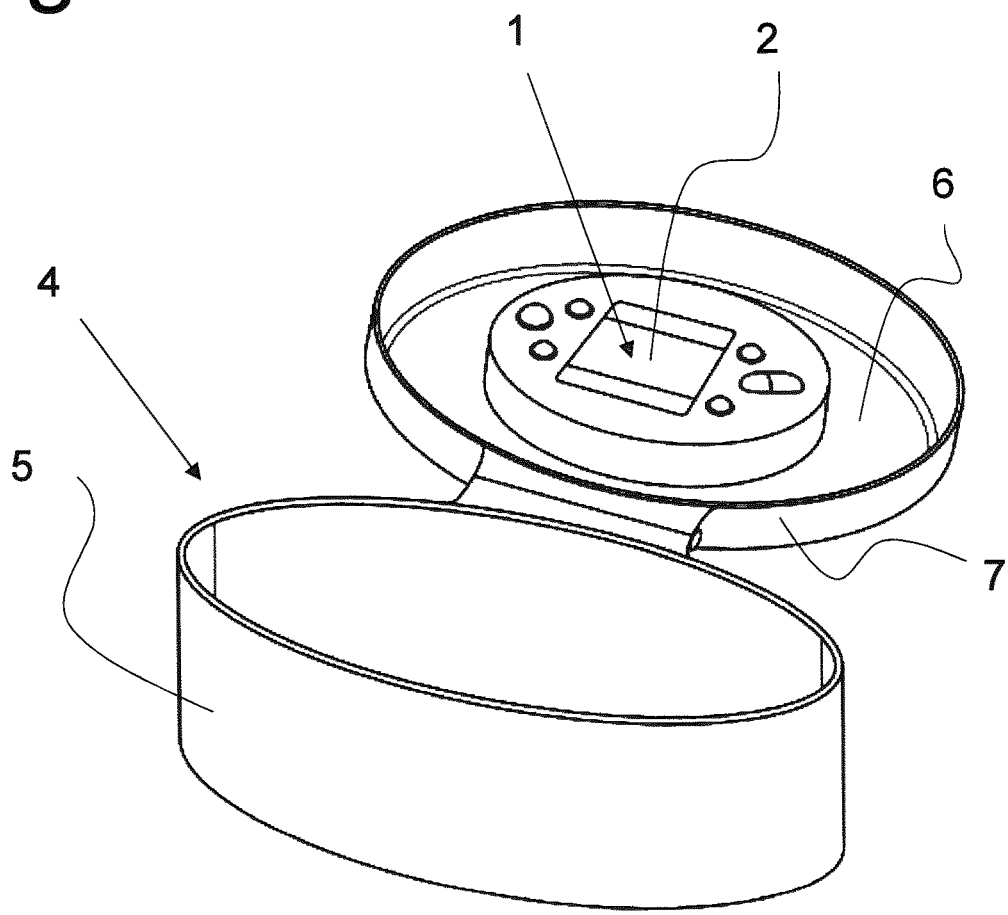
Figure 25:
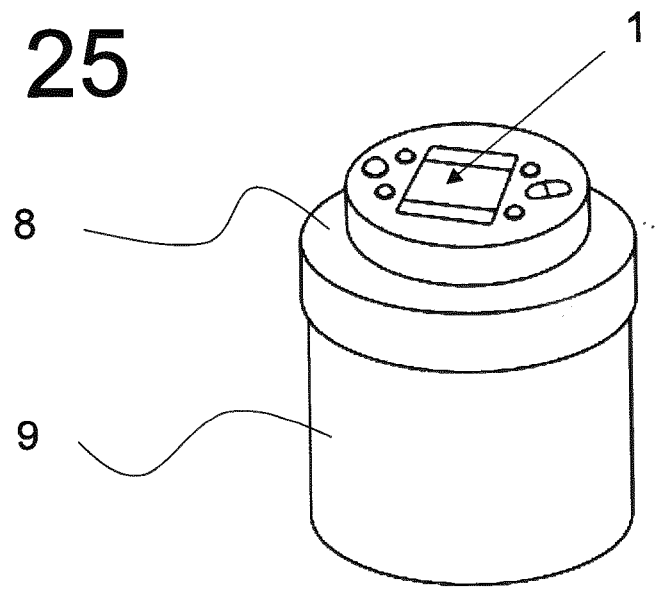
Figure 26:
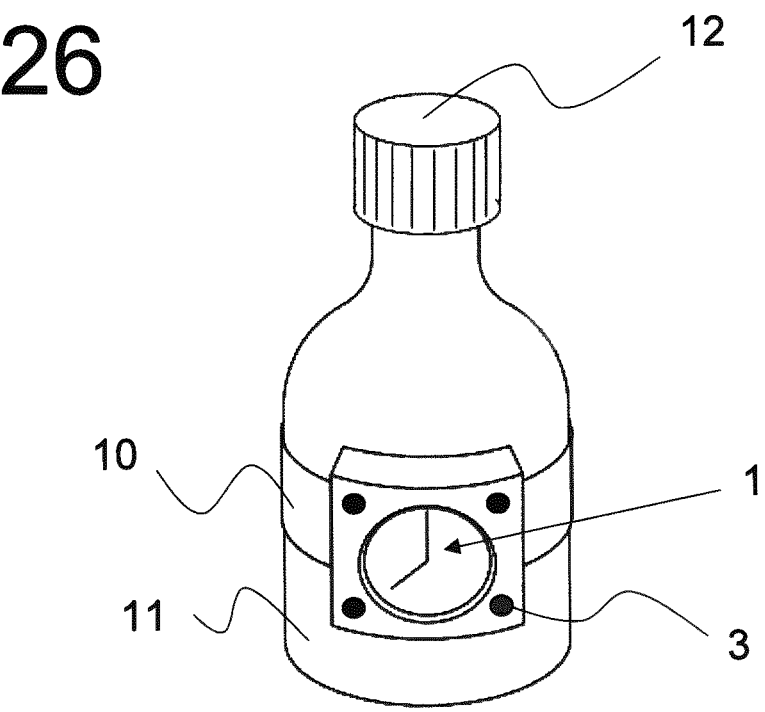
Figure 27:
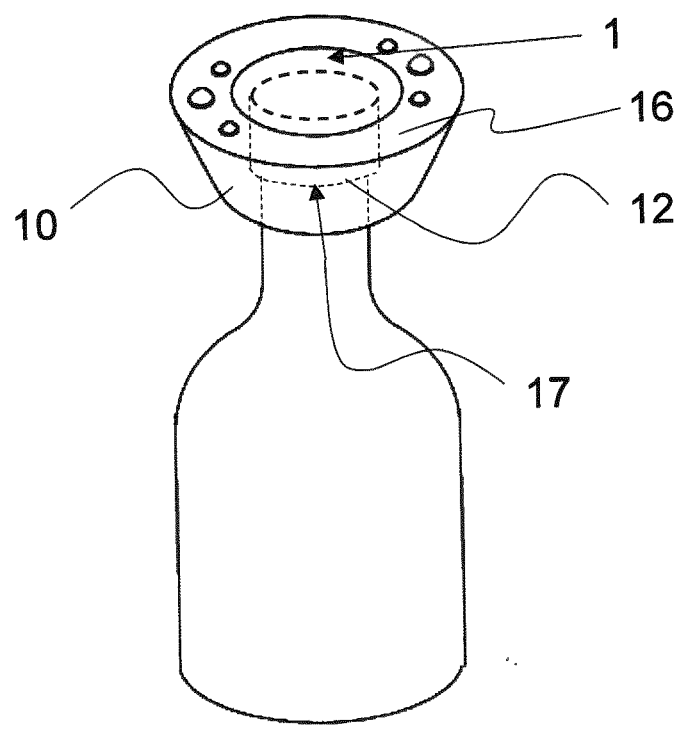
Figure 28:
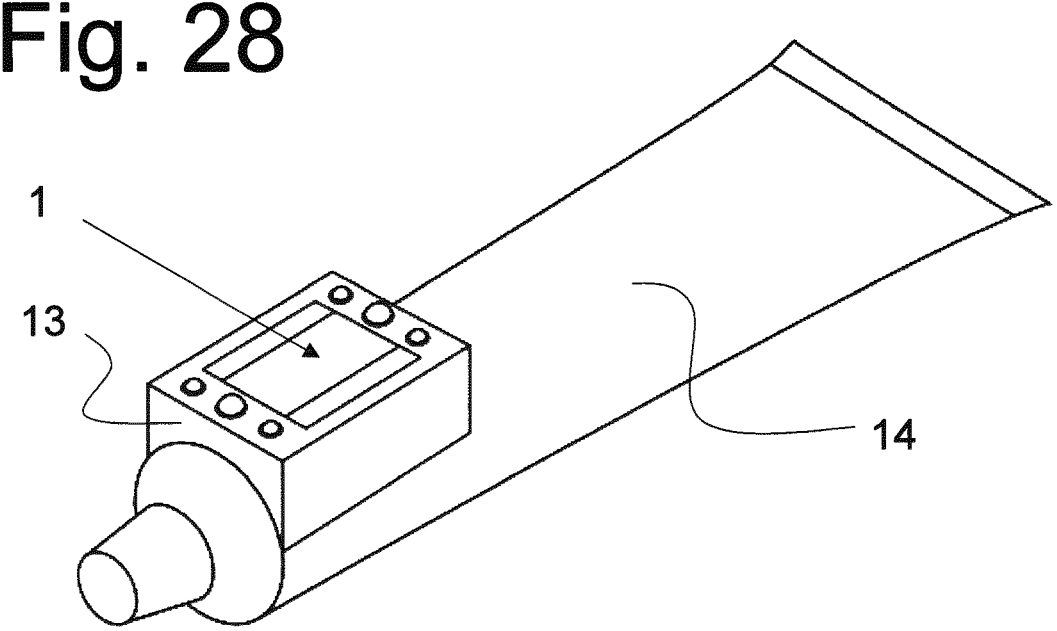
Figure 29:
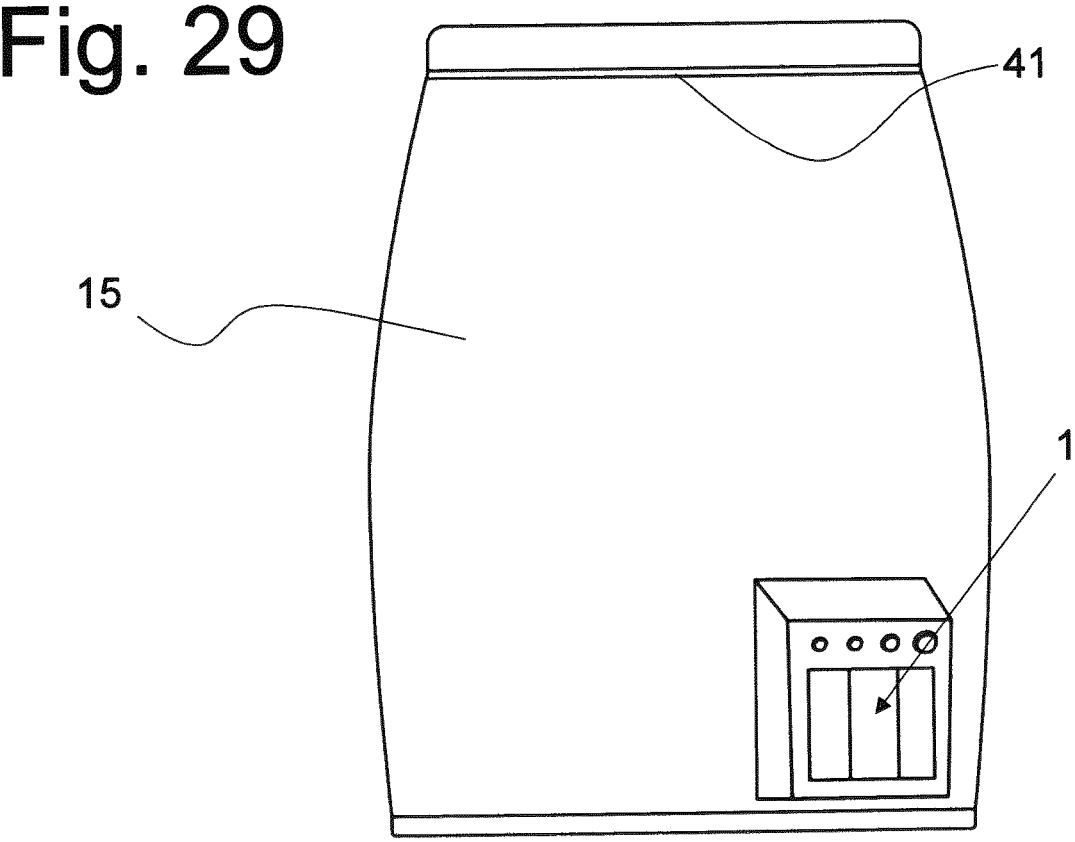
Figure 30:
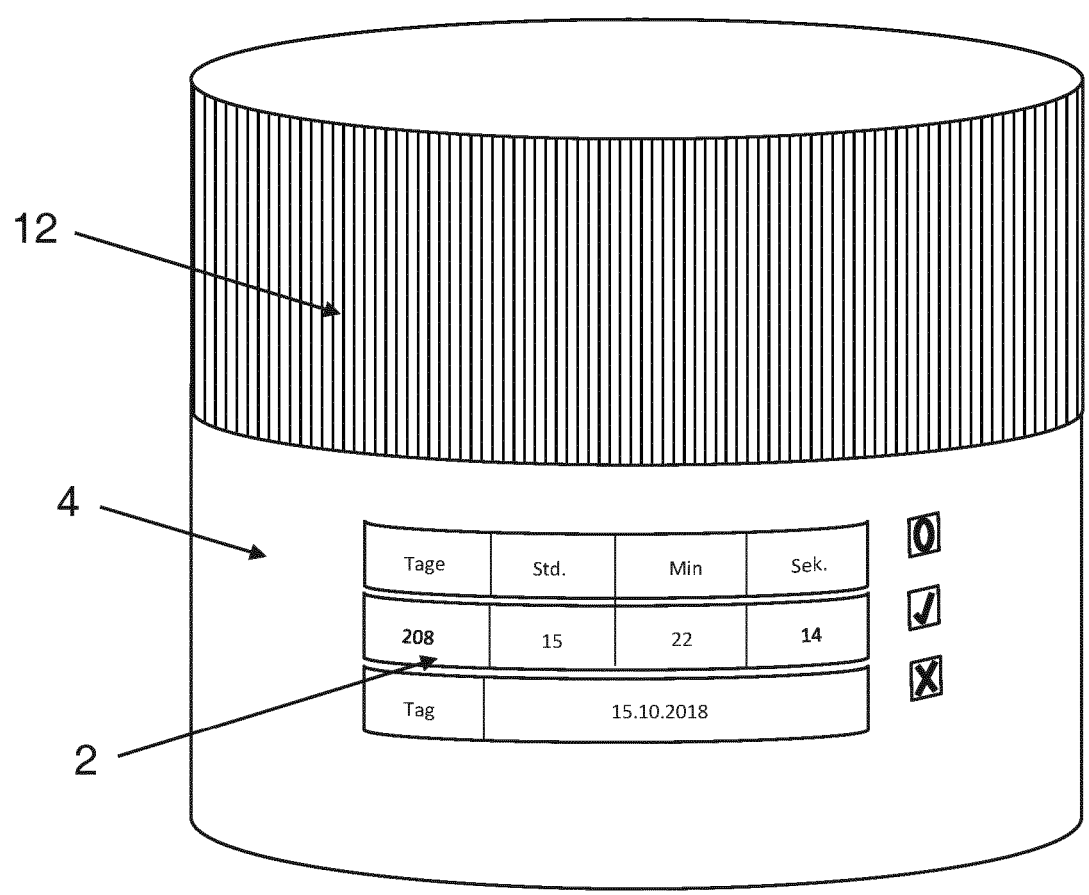
Figure 31:
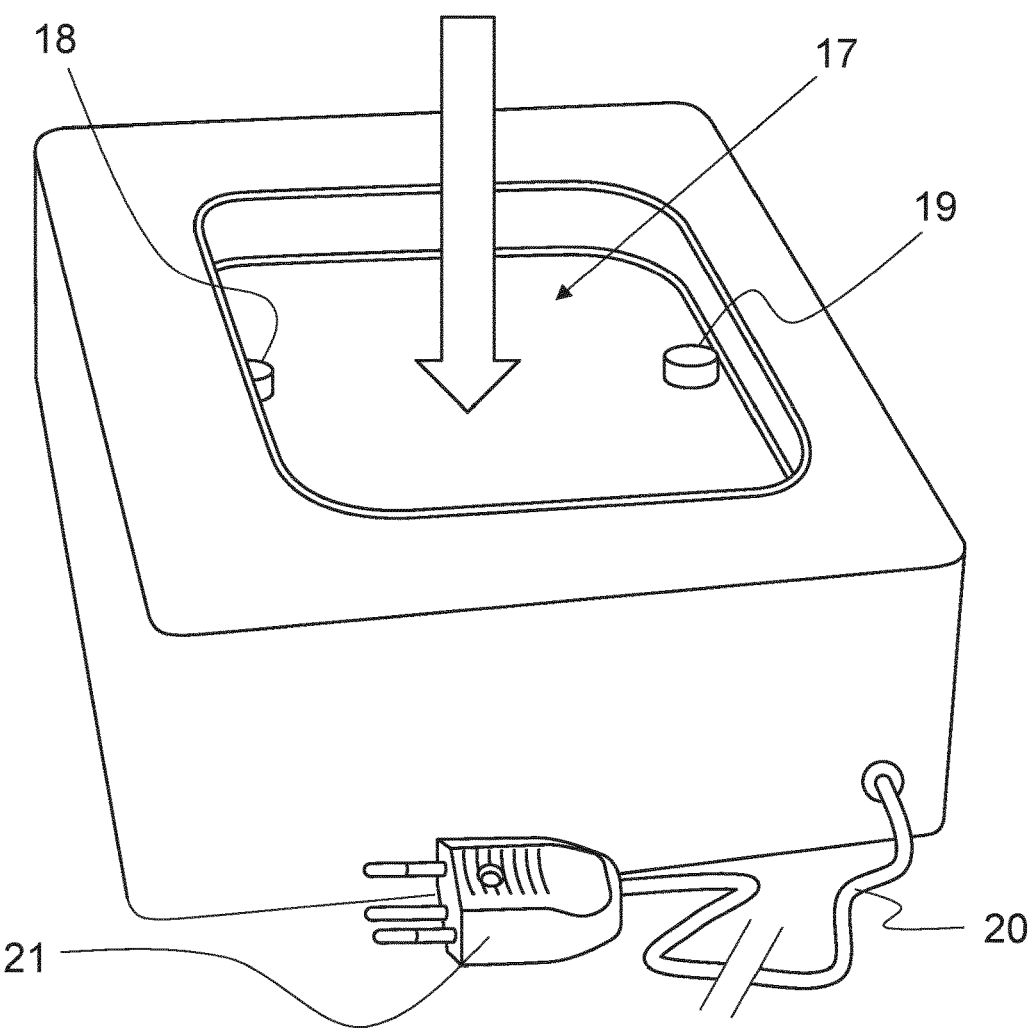

It Shows:

FIG. 1: A cube-shaped container as a can for cosmetics;

FIG. 2: This cube-shaped container for cosmetics in one exploded view with bottom part, housing and cover;

FIG. 3: The lid of the container with its inner insert;

FIG. 4: The housing of the container in a view obliquely from below;

FIG. 5: is a detailed exploded view of the container;

FIG. 6: A perspective view of the cube-shaped container seen obliquely from below;

FIG. 7: A perspective view of the cube-shaped container seen obliquely from above and behind;

FIG. 8: A perspective view of the housing from below with the electronic circuit board to be inserted and the battery;

FIG. 9: The display for installation in the container;

FIG. 10: A view of the bottom part of the container, with a support plate for the capsule to be inserted;

FIG. 11A: The individual parts for insertion in the bottom part of the container, with a pressure spring with a starter pin for triggering the timer function of the clock;

FIG. 11B: An enlarged view of the pressure spring as shown in FIG. 11A;

FIG. 12: A section through the bottom part with support plate and compression spring in the Initial state, before actuation of the starter pin;

FIG. 13: A section through the bottom part with support plate and compression spring in the state after the starter pen started the timer;

FIG. 14A: A view of the bottom of the container with the starter pin and a retainer plate for switching on the timer by pulling away the plate and releasing the starter pin;

FIG. 14B: An enlarged view of the starter pin and retainer plate as shown in FIG. 14A;

FIG. 15: A round container with an inserted capsule and a cutout indicated by dashed lines for inserting a curved display with an electronic circuit board and battery;

FIG. 16: An arch-shaped display with an electronic hidden therein circuit board and battery;

FIG. 17: A round container with an inserted display, indicated by dashed lines, with an electronic circuit board and battery therein;

FIG. 18: A capsule with cosmetics in it, and one shown below it receiving cylinder in which this capsule can be used in just a single rotational position;

FIG. 19: The capsule for receiving cosmetics, and below the associated receiving cylinder, in which this capsule can be inserted in only a single rotational position, viewed from above in a representation;

FIG. 20: A receiving cylinder for a container for cosmetics with, above it, a capsule aligned in its rotational position for insertion;

FIG. 21: A container for cosmetics with a receiving cylinder, indicated in its interior by dashed lines, for receiving a capsule in a specific rotational position;

FIG. 22: A digital electronic clock, suitable for installation with a cosmetic jar as a container;

FIG. 23: A box for the storage of tablets or pills, from which a single one is to be removed every day of the week;

FIG. 24: A cosmetic jar as a container with a clock with electronics in its lid is integrated;

FIG. 25: A cosmetic jar as a container with a clock with electronics in its threaded or attachment lid is integrated;

FIG. 26: A cosmetic bottle as a container with a clock with electronics, which is placed around its circumference and fastened or integrated;

FIG. 27: A cosmetic bottle as a container with a clock and electronics, which sits on its bottle cap and is connected to it;

FIG. 28: A cosmetic tube as a container with a clock and electronics attached to the tube;

FIG. 29: A cosmetic bag as a container with a clock and electronics attached to the bag;

FIG. 30: A cosmetic jar as a container with a clock and electronics with display integrated into the wall of the jar;

FIG. 31: A cosmetic jar as a container with an electronic clock, display and rechargeable battery, with an associated docking or charging station.

In FIG. 1, a container in the form of a cosmetic jar 5 is shown, in which a capsule with cosmetics is accommodated, preferably a disposable capsule. One also speaks of a jar or inner jar. This capsule is filled with an ointment, cream, paste, gel or powder. This cosmetic container 5 is designed here in the shape of a cube, for example in a handy size with an edge length of approx. 65 mm, but can also be designed in any other shapes and sizes. It is also clear that such a container can also be designed for other products with a limited period of use, for example for storing medicines, tablets, pills, capsules, ampoules and also all kinds of edibles. As a special feature, the container has a visible LCD, that is, a liquid crystal display 2 for displaying all kinds of data, as will be described and explained in detail later.

In FIG. 2, this cube-shaped container 5 for cosmetics is shown in an exploded view with base part 23, housing 24 and cover 25. In the housing 24 you can see the capsule 22 inserted here, which contains the ointment, cream, paste, gel or powder. In the bottom part 23 there is an electronic PCBA board (Printed Circuit Board Assembled) with an electronic circuit as well as a time element and a connected rechargeable accumulator or battery, so that an electronic clock 1 is created that can function as a timer and stopwatch, but can also display the current calendar year, the date and time, and optionally other data, for example text and images. A Hall sensor 27 for starting the timer function as a result of the change in a magnetic field when a filled capsule is inserted into the housing 24 can also be seen here.

FIG. 3 shows the lid 25 of the container with its inner insert 28. Four permanent magnets 29 arranged all around can be inserted into special insert holes in the insert and these work together with such permanent magnets in the interior of the lid 25, so that this inner insert can be easily connected to and separated from the lid 25 without tools.

FIG. 4 shows the housing 24 in an oblique view from below, with a recess 31 through which a capsule with an ointment, cream, paste, gel or powder can be inserted from above.

FIG. 5 shows a detailed exploded view of the entire container, starting from the bottom with the bottom part 23, with the electronic PCBA board 26 therein, with guide pins 32 for the plate 34 shown above, which are slipped over these guide pins 32 and into the bottom part 23 is used. The LC display 2 can also be seen, which can be covered with a transparent window plate 35, preferably made of acrylic glass (PolyMethyleneMethAcrylate PMMA) and a compression spring 33, the function of which will be explained later.

Further up in the drawing you can see the housing 24 with its recess 31 for the capsule 22 to be inserted from above, as well as one of four permanent magnets 30 on the inside at the lower edge for placing and holding the housing 24 on the bottom part 23, where such permanent magnets are arranged. The capsule 22 is shown further up, above the housing 24. This is a disposable capsule made of plastic, aluminum or a biodegradable material, which has a sealing ring 37 at the top. The capsule 22 and the associated sealing film 38 can, if necessary, also be designed to be oxygen-tight, for example with an aluminum layer built into the capsule and also into the sealing film. At the very top you can see the cover 25 with its inner insert 28, as already described for FIG. 3.

In FIG. 6, the assembled container for cosmetics is shown in a perspective view of the cube-shaped container 5 seen obliquely from below. You can see the LC display 2 on its front and a mechanical safety device or installation with a plate 45 for triggering the timer function, which is actuated when the container is opened for the first time, as will be explained in more detail later. FIG. 7 shows a perspective view of the cube-shaped container 5 seen obliquely from above and behind. A USB interface 39 is used to charge the rechargeable battery inside the bottom part 23, which supplies the electronic PCBA board with power.

FIG. 8 shows a perspective view of the housing 24 from below with the electronic PCBA board 26 to be inserted and the rechargeable battery 40. A disposable battery can be used instead of the rechargeable battery, which then has to be replaced from time to time. Four permanent magnets 30, three of which are visible here, serve to fasten the housing 24 to the base part 23. The integrated circuit on the PCBA board 26 processes the signals from the Hall probe 27 (FIG. 2) and the inputs made by the operator, and the Hall probe 27 detects when a closing magnet comes to lie opposite it on the cover. This activates the timer. The processed signals are displayed on the LC display (Liquid Crystal Display) 2 as shown in FIG. 9. From the left, the number of days that have elapsed DDD is displayed in three digits after the timer has started, i.e. a maximum of 999 days, then the time in hours HH, minutes MM and seconds SS, and on the far right the accumulator or battery charge status 36. Left of the battery or Battery charge status display 36, further displays can optionally be made possible, for example for "not yet opened", "product still life", "product expired" etc.

FIG. 10 reveals a clear view of the bottom part 23 of the cube-shaped container, with the support plate 34 for the capsule to be inserted and, underneath, the rechargeable battery 40 inserted. The display 2 is attached to the front of the base part 23.

FIGS. 11A and 11B show this base part 23 with its individual parts shown separately, that is to say with the LC display 2, the rechargeable battery 40, the support plate 34 and the retaining pins 32 for placing the support plate 34 on. A compression spring 33, which is shown enlarged to the right in this illustration, is also inserted into the bottom part 23. A pin 43 extends axially in the compression spring 33 and carries a contact plate 44 at the top and can be held in a certain axial position by a holding plate 45 at the bottom against the force of the compression spring 33. The function of this pin 43 is evident from FIGS. 12 and 13. As shown in FIG. 12, in a section through the bottom part 23 with support plate 34, the pin 43 protrudes from the bottom 46 of the bottom part 23 and there sits a holding plate 45, which engages in a circumferential groove 53 in the pin 43 and removes it holds on in this position. If the holding plate 45 is pulled away from the pin 43, it releases it and the compression spring 33 pushes the pin 43 together with the upper contact plate 44 upwards, after which the contact plate 44 strikes the electronic PCBA board 26 and makes electrical contacts on it, so that their timer function is activated. It is clear that this triggering of the timer function can also be implemented electronically and without contact, for example by means of magnets. From now on, i.e. from the start of the timer function, the electronic circuit measures the current period of time the capsule remains in the container 1 and the remaining service life of the contents is calculated and shown on the display 2. The circuit board can also contain an acoustic element (beeper) or a loudspeaker, so that, in addition to the optical display, an acoustic signal or an audio message can also be played when the remaining service life of a product has expired.

FIGS. 14A and 14B show a view of the underside of the container 5 or its bottom part 23 with the pin 43 and the retaining plate 45 for switching on the timer by pushing back the plate 45 and thus releasing the pin 43, which is then moved towards the PCBA board. The section with the pin 43 and the retaining plate 45 on the bottom 46 of the bottom part 23 is shown enlarged to the left of the figure.

FIG. 15 shows the variant of a round container 5, for example a glass or acrylic jar, with inserted capsule 22 and cutout 42 indicated by dashed lines for inserting a curved display with electronic circuit board and battery from below. FIG. 16 shows the matching arcuate display 2 with an electronic PCBA board and battery hidden therein, and FIG. 17 shows this round container 5 with an inserted display 2 with an electronic PCBA board and battery therein. In this container 5, the capsule 22 closed at the top with a sealing film is inserted with a cream, ointment, paste, gel or powder and then the sealing film is torn away from the capsule 22 and the container 5 is closed with a threaded lid, whereby the timer function is started by closing an electrical contact by pressing the capsule all the way down and snapping or locking it into place.

FIG. 18 shows a special capsule 22 for use in a receiving cylinder 52 shown below in the interior of the container 5. This capsule 22, which is in principle rotationally symmetrical here, has at least two axially extending ribs or beads 48, 47 on its outer circumferential wall. One of these ribs or bulges 47 is made thicker and thus the capsule 22 only fits into the receiving cylinder 52 in a very specific rotational position. For this purpose, this receiving cylinder 52 has axially running grooves 50, 51 in its inner wall 49, into which the ribs or beads 48, 47 on the capsule 22 fit. The thicker rib or the thicker bead 47 on the capsule 22, however, only fits into the larger receiving groove 51 and thus the capsule 22 can only be inserted in a very specific rotational position. Instead of ribs and grooves of different sizes, the ribs and grooves can also have different profiles. Electrical contacts at the bottom of the receiving cylinder 52 are closed by the complete, snap-in insertion of the capsule 22, so that a circuit closes and the electronic circuit can determine whether and, if so, which type of capsule 22 has been inserted into the receiving cylinder 52 in the container 1. Depending on the product, the integrated circuit in the container can calculate the remaining time of the product in the inserted capsule 22 and show it on the display. In another embodiment, the start of counting the remaining time of the product can generally be triggered by inserting the capsule. Mechanical contacts or locking elements 57 can also be attached to the edge of the receiving cylinder 57, and the receiving cylinder 57 can be equipped with a display 2 and an electrical connection 20.

FIG. 19 to the right shows the capsule 22 and, below it, the receiving cylinder 52, seen from above. The thick bead 47, if one imagines the circumference of the capsule 22 as the face of a clock, is approx. 11:00 o'clock on the outer edge of the capsule 22 and it only fits in the corresponding rotational position in the receiving cylinder 52 shown below. The thinner bead 48 on the capsule 22 is here at the point where 08:00 o'clock would be on the dial. If the capsule 22 is inserted into the receiving cylinder 52 in the corresponding rotational position, the thinner bead 48 comes to lie in that groove 50, which would then count a running time or consumption period of 9 months, by lapse of the time from 9 months to zero, whereby the remaining time is continuously shown on the display. In the embodiment of the capsule 22 shown, there is also an angular, axially extending strip 54 on the outer circumference of the capsule 22, and corresponding axially extending grooves 55 with an angular cross-section are excluded in the inner wall of the receiving cylinder 52. If the shown capsule 22 with its angular bar 54 is inserted into the receiving cylinder 52 at the point between 12:00 and 01:00, whereby, as already mentioned, it can only be used in a single possible rotational position, the bar 54 is pushed into the groove, which is marked with 10° C. The container can namely have a built-in temperature sensor which continuously monitors the temperature of the capsule. If the temperature is ever exceeded above 10° C., this is recorded and shown on the display. So if the ingredients are at max. 10° C., this container can be placed in the refrigerator, in which a temperature of usually approx. 7° C. prevails. Alternatively, the container can also be equipped with a Peltier element, which ensures the necessary cooling. This container then not only monitors the remaining time, but also the storage temperature. If the capsule 22 is suitable for a storage temperature of 20° C., i.e. room temperature, a corresponding capsule is used, one groove of which then fits into this corresponding groove for storage at 20° C. and the display then shows: Store at room temperature. If an active ingredient is to be stored or applied at 30° C., electrical heating is required which can be maintained and regulated in the capsule 22 via the mains connection by means of a small built-in heating element in the bottom of the container. FIG. 20 shows the capsule 22 in the only rotational position in which it can be inserted into the receiving cylinder 52 below.

FIG. 21 shows this container 5 for cosmetics with a receiving cylinder 52, indicated by dashed lines inside, for the inserted capsule 22, also drawn in dashed lines, and with the display 2 on its front side for displaying the respective remaining time of the product in the capsule 22. Because the electronic circuit can recognize what type of product it is based on the rotational position of the capsule 22, many other information about this product can be shown on the display 2, for example information about the composition of the cosmetic product and the active ingredients it contains, how to handle and use the product, such as how often and where to apply it, etc. In principle, the concept presented is about the implementation of a refill system in which the effective active ingredients are inserted into the container by inserting refill capsules, which can then guarantee all of the additional functions described.

In the following, further versions of the basic concept of a container 5 for cosmetics with a clock with a timer function are described. The functions described below can all also be integrated in the circuit and the display 2 for the designs of the cosmetics containers 5 previously described in FIGS. 1 to 21. In FIG. 22, an electronic clock 1 with a rechargeable battery and with an electronic display 2 is shown. This clock 1 is on the one hand a clock with a perpetual calendar, which means that it not only shows the time, but also the calendar year, month and day of the week. In addition, this clock 1 has a stopwatch function and an alarm clock or Timer function and has the option of entering a date as well as a storage medium for storing the same. The clock 1 can therefore also display the number of days/hours/minutes/seconds up to a stored date. For example, a Color Super Twist Nematic display or CSTN display in question. These are so-called nematic rotary cells, which are used for display on an LCD screen. In the case of the CSTN display, it is a color display that is created using a passive matrix. This means that the individual pixels or the liquid crystals of the screen are controlled passively. In practice, CSTN displays are somewhat weaker in terms of their playback quality, but they consume significantly less energy, which saves the battery. The lower playback performance on the slower image build-up is clear.

As already mentioned, a liquid crystal display, a so-called "LCD" or "Liquid Crystal Display", can be used instead of a CSTN display. Most modern electronic devices employ LCDs in simple and complex forms. In this form of display, images are generated by the fact that liquid crystals polarize light using an electrical voltage, and the watch can also be equipped with acoustic elements for emitting alarm tones. An LCD is made up of different segments in which there is a large amount of liquid crystals. The alignment of the crystals in the individual segments can be controlled by the electrical voltage. This regulates the permeability of polarized light, which is guided through the segments by a backlight and filter. In LCDs that are supposed to display any image, the individual segments are arranged according to a grid. One then speaks of pixels or Pixels. The higher the number of these pixels, the sharper the image on the LCD.

As a further alternative, a display with organic light emitting diodes, i.e. with organic light emitting diodes, can be used. In contrast to LCDs, OLED displays work without a backlight. While an LCD acts like a filter for the light developed in the background, OLEDs themselves emit colored light. These displays do not need crystals to generate images. The big advantage of OLED displays is that they are very thin and can be placed on almost any material. They require very little energy, which saves the battery. By means of buttons and/or rotary knobs 3, the various functions can be selected and used in a menu that is shown on the display.

These mentioned displays require separate buttons or rotary knobs to operate the functions. A touchscreen does not need such buttons or rotary knobs, i.e. a display that makes it possible to control the electronics inside by touching the display. Modern cell phones have been doing without a conventional keyboard for years. Instead, text is entered via the touch-sensitive display. One can distinguish between different types of touch screens. Capacitive or resistive touchscreens are predominantly used in cell phones. Capacitive touchscreens can only be used with the hands or conductive pens, which excludes operation with gloves or hand prostheses. Since resistive touchscreens react to pressure, they can also be operated with gloves.

The main menu is set by pressing a separate key or by means of a "key" on the touchscreen of such a watch on a cosmetics container, which offers the following selection, for example:
A: Set the current date and time
B: Setting an expiry date
C: Clock function: Displays the calendar year, month, day and time
D: Stopwatch and alarm clock function If you select A, the last calendar year set, the month, the day and the time appear. A button or a rotary knob 3 can be used to switch to the various displays of calendar year, month, day and time on display 2. With each selected time function, you can scroll forwards or backwards with another button or a rotary knob 3 to set the desired time. The process is completed by pressing the SET button. Clock 1 is now set.

If you select function B, you can enter a desired expiry time of a product in the same way as for function A, usually a specific calendar year with month, whereby the time is then irrelevant. An alarm function can also be switched on or off. This function is now also programmed by pressing the SET button. When the selected month is reached, an acoustic warning tone sounds via a built-in loudspeaker, which can be silenced by pressing the SET button. The prerequisite for the sound of the warning tone is that the lid of the can is open so that this warning tone does not sound continuously in the absence of a user. This can be implemented in that the watch only generates a warning tone signal when certain conditions are met, for example by being in a certain position or by certain electrical contacts being opened or closed. In the selected function C, the current time is displayed with day, month and calendar year. When menu D, the stopwatch function, is selected, the clock shows 00:00. As with setting the time, a running time can now be selected, for example 05:30, for 5 minutes and 30 seconds. This runtime is confirmed with the SET key. A second press of the SET button resets the clock, and if the clock starts to run with a start button, it will emit a warning tone when it reaches 05:30. In this way, for example, an exposure time can be precisely adhered to, even if the user moves away from the can for a short time. The clock can also be used to remind the user of the usage interval, e.g. B. every three days, once a week, etc. To do this, you simply set the stopwatch to such a length that it emits a signal at the desired time, for example in three days at the wake-up time when a certain cream should be reapplied. This avoids forgetting the active ingredient to be applied regularly at certain intervals. There is also the option of setting the exposure time using the clock. This also applies to activation/triggering when the jar is opened by removing the protective film from the cream. The activation or The start of the counting of the remaining running time can also be triggered by magnets that trigger the start when the capsule is inserted. Because the watch has a stopwatch function, it can of course also be used as an alarm clock or timers can be used for other purposes. At this point it should be mentioned, without showing this in a special figure, that the built-in clock can have an analogue display, so that an hour hand, a minute hand and a second hand are displayed instead of presenting the time in digital form. A mechanical watch with such pointers is even conceivable in a luxury version. The clock, whether electronic or mechanical, can be equipped with a battery to provide it with energy.

In one variant, it can be a rechargeable battery. An associated solar cell can be installed on the clock or on the container, which continuously recharges the battery, or the battery is recharged via an electrical connection.

FIG. 23 shows a box for storing tablets or pills, one of which is to be taken every day of the week. For this purpose, it is equipped with a container capsule which is divided into seven circle segments 56, a single circle segment for each day of the week. The individual circle segments 56 are clearly labeled with the day of the week in question. By using such a can, it is immediately recognized when a tablet is left lying on a certain day of the week. In addition, the timer can be set so that the user is reminded every day at a selectable time with an acoustic signal to remove a tablet or pill.

An embodiment of a cosmetic jar 4 with an integrated time-stopwatch 1 is shown in FIG. 24. A cosmetic jar 4 here forms an oval container 5 with an associated hinged lid 6 with a downwardly protruding edge 7. Various cosmetic utensils can be accommodated in this cosmetic jar 1—brushes, tweezers, mascara pens, nail files, etc. In addition, various make-up colors, creams, ointments, gels and powders are also included. Certain products have a shelf life limit or they may also require a certain exposure time. The clock 1 can be programmed in such a way that the entire menu can be run through as described above for different products, for example for ten different products. The function for the expiration time and the function for the exposure time can then be assigned to ten different products, with each product being assigned a number, and this number can be glued to the product in question in the cosmetic jar by means of an adhesive, or it is attached with a waterproof felt pen written on it. This ensures that a product that is too old is never used again and that skin irritation or infections can be avoided.

Another embodiment is shown in FIG. 25. Here, such a clock 1 is attached as a container on top of the lid 8 of a cosmetic jar 9, this jar containing, for example, a certain cream or ointment. It is generally a question of packaging of any type, shown using the example of a can. In the lid 8, a spring ring can be installed along its resting lid part, which is relieved when the lid 8 is removed from the can 9. Only then is the alarm function, the emitting of a warning tone, possible. This ensures that no alarm tone can sound permanently if the can is closed and the user is not present.

FIG. 26 shows a container in the form of a cosmetic bottle which is equipped with a watch 1 as described above. The watch 1 can be attached to the bottle body 11 like a wrist watch, for example with a rubber elastic band 10 or with a tensioning buckle. As an alternative, the clock can also be built into the bottle or integrated into the bottle wall. The bottle can be designed as an airless dispenser, which is equipped with a dispenser, which allows the withdrawal of precisely dosed amounts of liquid.

In an embodiment according to FIG. 27, the clock 1 is connected to the bottle closure or is coupled together with a closure cap 12. It can be a watch case 16 which has a hollow cylindrical recess 17 at the bottom, with which it can be placed on a bottle via a conventional 28 or 36 screw cap 12. The inner walls of the hollow cylindrical recess 17 can be equipped with spring steels arranged at an oblique angle to the radial line of the hollow cylinder, which protrude very slightly and which jam in the release direction with the outside of the closure cap 12 of the bottle and thus enable the closure cap 12 to be easily loosened by turning the watch case 16.

FIG. 28 shows an embodiment in which a watch 1, as already described, has a housing which forms a base 13 for the watch 1, the base 13 being designed so that it fits onto the round circumference of a filled tube 14. It can be attached to the same by means of a Velcro fastener. A strip of part of a chain fastener is glued onto the tube 14. The associated other strip with the counterpart of the Velcro fastener is glued onto the inside of the lower arch of the base 13. When the tube 14 is almost used up, this clock 1 can be removed from it again and attached to a new tube.

FIG. 29 shows an embodiment of a cosmetic bag 15 with a pressure lock 41. The watch 1 is fastened with its housing on the bag 15. One strip of part of a chain fastener is glued to the outside of the bag 15, and the other strip is glued to the underside of the housing of the watch 1 to be attached. When the contents of the bag are used up, this watch 1 can be removed from it again and attached to a new bag.

FIG. 30 shows an embodiment of a cosmetic jar 4 with a screw-on lid 12. The clock 1 is integrated with its housing in the wall of the box and shows how a well thought-out display 2 can be designed. To the right of the wide display 2, three boxes can be seen. If, for example, a blue light is displayed in the top box, this means that this can 4 has never been opened, or with regard to the content: not yet active. It is a tamper-evident guarantee. If the middle box lights up green, it means that the contents of the can, which has already been opened, are okay, ready for use, i.e. contents okay. If the bottom box lights up red, this means: content is unusable. This is the case when the content has passed a certain age. The top line of the large display shows from left to right: day, hour, minute, second. Below that, specific numbers are displayed, i.e. an example from the left: 208, which means that the content is still available for use for 208 days, 15 hours, 22 minutes and 14 seconds. This period of time runs like an hourglass every second until the display shows 000, 00, 00, 00 and then the red warning light at the bottom right lights up immediately. In the line at the bottom of display 2, the current calendar day and the current time are shown.

Furthermore, the clock can be used to remind the user of the usage interval, e.g. B. every three days, once a week, etc. Another function is to display the exposure time of the product so that an optimal result is achieved. There are also many other functions that work with the aid of acoustic and visual signals and which can support users in the correct use of cosmetic products. Regardless of which ingredients the capsule or can contains, the electronics can take on other functions and, for example, trigger a reorder of one or more capsules by transmitting data via an app, or display new product information sent by an app.

When equipped with a rechargeable battery, the container advantageously closes an associated docking station or Charging station with connection cable 20 for the household electrical network, as shown in FIG. 31. The container can be inserted into the receiving recess 17, and then the electrical contacts 18, 19 there close with the corresponding poles on the underside of the container and the battery is then recharged, or charging takes place wirelessly by means of induction. This docking station has a power cord 20 with an associated power plug 21, which can be plugged into any household socket, if necessary by means of an adapter for the respective national standard for sockets. The charging station includes a transformer to transform the mains current to the battery voltage and an electronic circuit to interrupt the charging current as soon as the battery is fully charged again. The container can be detachably connected to this docking station by mechanically plugging in or placing it on, so that the electrical contacts are automatically closed when the device is placed on, via which the rechargeable battery can be charged to the electronic clock with stopwatch and alarm clock function. The display of the container can have a charge status indicator so that the user can see at any time how long the container or the cosmetic jar can be used independently when traveling. The docking station is designed in such a way that different containers fit into it in a standardized manner for charging the batteries inside.

Finally, the container can be designed as a box or bag and equipped with such a timer that, at a certain adjustable point in time, i.e. time-controlled, the playback of an announcement, for example a personalized congratulation, a poem or a melody or even a video Triggers clips on the display for playback. For this purpose, the electronics of the box or bag can access a data carrier that can be plugged into a USB interface on the box or bag, so that any audio or video content can be copied to this UBS data storage device by the user can then be played at the selected time. In this way, the can or the bag can be used for the effective handing over of gifts which are sent to a person living at a distance. The handover can thus take place as a surprise effect with an accompanying audio or video. In an accompanying letter, the recipient can be informed that he should not open the can or bag immediately upon receipt, but should put it on the table, and only when all of his invited guests are present, he should wait for the rest of the time at the announced time. For example, a jewel, a piece of jewelery or jewelery can be presented in a very effective way by opening the lid of a can automatically at the selected time or by automatically opening the bag. In the case of a can, the lid can be closed against the force of springs and held in the closed state by means of permanent magnets. An electromagnet is actuated time-controlled so that it briefly overcomes the forces of the permanent magnets and then the lid pops open by virtue of the springs. In the same way, a bag can for example have an opening which is held open by two bent spring steel rods. The two spring steel bars, which extend on both sides along the bag opening, are forced into the straight position by means of permanent magnets, so that the opening of the bag is kept closed with a closed slot. An electromagnet overcomes the force of the permanent magnets briefly at an adjustable point in time, so that the bag opening then pops open due to the spring forces of the spring steel rods. First, for example, a personalized announcement starts, for example in the form of an audio or video message, and at the crucial moment of the message the lid or bag pops open and reveals the content and presents it surprisingly and effectively.

INDEX OF NUMERALS

1 Clock
2 Display
3 Turn the button
4 Cosmetic jar
5 Container
6 Cover
7 Protruding edge
8 Lid with clock
9 Can, airless dispenser, packaging
10 Rubber elastic band
11 Bottle body
12 Closure cap, twist lock
13 Base
14 Tube
15 Cosmetic bag 16 Watch case
17 Recording recess
18 Electric contact
19 Electric contact
20 Power cord
21 Power plug
22 Capsule with cosmetic product, (inner jar)
23 Bottom part of the container
24 Casing
25 Cover
26 Electronic circuit board
27 Hall sensor
28 Inner insert of the lid 25
29 Permanent magnets on insert 28
30 Permanent magnets on the lid
31 Recess in housing 24
32 Guide pins in the bottom part 23 compression spring Mounting plate
33 Compression spring
34 Support plate
35 Acrylic glass viewing window
36 Battery charge status display
37 Sealing ring
38 Sealing film
39 USB interface for charging cable
40 Rechargeable battery
41 Snap fastener
42 Recess in a round container
43 Pen for activating the timer function
44 Upper retaining plate for pin 43
45 Release plate 45 at the bottom of the pin 43
46 Bottom of the bottom part 23
47 Thick rib or groove on the outer wall of the capsule (inner jar)
48 Thin rib or groove on the outer wall of the capsule (inner jar)
49 Inner wall of receiving cylinder 52 for capsule 22
50 Thin grooves in the receiving cylinder
51 Thick groove in receiving cylinder
52 Receiving cylinder, inside the container
53 Groove in pin 43
54 Profile with an angular cross-section on the capsule 22
55 Grooves with an angular cross-section in the inner wall 49 of the receiving cylinder 52
56 Circular segments in the capsule
57 Mechanical contact or closure at the edge

The invention claimed is:

1. A container for replaceable cosmetics and replaceable products with limited usage time or for presenting of the replaceable products in the container over a preset period of time, in which container a clock with rechargeable battery or battery and associated optical display is installed, and which clock is a stopwatch or has an alarm clock function to display the usage time of the product contained in the container or for the time period of the presentation of the product in the container, the container comprising:

an electronic circuit with time element as an electronic clock on an electronic PCBA board, with an associated display for visual display of at least the usage time of the product contained in the container, as well as optionally for the optical display of text and images or films, or additionally with a loudspeaker for triggering and playing an acoustic and/or visual product presentation on the display from a storage medium, wherein a bottom part of the container contains a mounting plate which rests on insert pins and on which a compression spring-loaded pin protruding from the bottom of the bottom part, which hits the electronic PCBA board in the bottom part when the compression spring is triggered and closes electrical contacts there, in order to trigger a timer function the time element of the electronic circuit of the electronic PCBA board.

2. The container according to claim 1, further comprising a receiving cylinder for inserting a replaceable capsule with the product as its contents, which receiving cylinder is operable to be closed with a sealing film, and the receiving cylinder has grooves of different sizes or different profiles in its inner wall, and the replaceable capsule to be inserted, depending on a rotational position of the replaceable capsule in respect to the receiving cylinder, which replaceable capsule has matching ribs or grooves on its outer wall, so that the replaceable capsule can be inserted into the receiving cylinder in just one single rotational position, and thus recognizes a type of capsule and the receiving cylinder has a bottom part, a housing with a recess for inserting the capsule in the receiving cylinder and a cover, and a base part of the container containing the electronic clock or the electronic circuit board with time element and a rechargeable battery or a battery, and a display.

3. The container according to claim 2, wherein a Hall sensor is installed which detects the insertion of a capsule by changing a magnetic field and thus starts the timer function of the electronic circuit.

4. The container according to claim 1, wherein an electronic clock with a stopwatch and alarm clock function with an associated rechargeable battery is installed in the container, and the container including an associated docking station connectable to a household electrical system, to which the container is detachably connectable by mechanical plugging or placing, so that electrical contacts are closable, via which the rechargeable battery of the electronic clock with stopwatch and alarm clock function is chargeable.

5. The container according to claim 1, wherein the electronic clock has an electronic optical display for a digital or analog display, and buttons or rotary knobs are attached to its housing, by means of which the electronic circuit on the electronic PCBA board can be operated, this electronic circuit offering at least the following functions and making them showable on the display:

A: Set the current date and time,
B: Setting an expiration date,
C: Clock function: display of the calendar year, month, day and time,
D: Stopwatch and alarm clock function,
wherein that the clock can be supplied with energy from a rechargeable battery which can be charged via an associated solar cell, and wherein a display acts as a tamper-evident guarantee by lighting up as long as the container has never been opened, a further display when the container has been opened shows whether the replaceable cosmetics or products contained in the container are still in order, and a third display shows when the replaceable cosmetics or products contained in the container have exceeded an adjustable age.

6. The container according to claim 1, wherein the container is a can with a cover in the form of a lid fitting thereon with a downwardly protruding edge, the lid having a hinged connection that can be opened over more than 90°, and the clock is built into an underside of the lid and its alarm functions are only effective in an oblique position with the display pointing upwards.

7. The container according to claim 1, wherein the container is a bottle and the clock includes a watch that can be placed around the circumference of the bottle body like a wristwatch by means of a rubber elastic band.

8. The container according to claim 1, wherein the container is a bottle and the clock is built into the bottle or is built into a wall of the bottle.

9. The container according to claim 1, wherein the container is a bottle with a rotary cap and the clock is housed in a housing which has a hollow cylindrical recess on its underside and has spring steels arranged at an oblique angle to a radial of the hollow cylindrical recess, which protrude just into the hollow cylindrical recess, and this housing can be slipped over the rotary cap of the bottle with a snug fit, and the rotary cap, when turned in a release direction, can be unscrewed from the bottle due to jamming of the spring steels.

10. The container according to claim 1, wherein the container is a tube and the clock is housed in a housing which has a bottom with a curved base so that the clock with the housing can be placed on a circumference in a front area of the tube, the base being held on the tube by means of one or more Velcro fasteners.

11. The container according to claim 1, wherein the container is a resealable plastic bag, and the clock is housed in a housing which is attached to the plastic bag by means of a flat underside of the housing and being held on the plastic bag by means of one or more Velcro fasteners.

12. The container according to claim 1, wherein for the time-controlled presentation of products, the container is designed as a can or bag, wherein the container has a mechanism for automatic time-controlled opening of a lid of the can or bag, as well as a USB interface for inserting a data carrier, as well as a loudspeaker and display for playing audio and video messages from the data carrier, controlled by the electronic circuit on the Printed Circuit Board Assembled (PCBA) board.

* * * * *